US007065385B2

(12) United States Patent
Jarrad et al.

(10) Patent No.: US 7,065,385 B2
(45) Date of Patent: Jun. 20, 2006

(54) APPARATUS, METHODS, AND COMPUTER PROGRAM PRODUCTS FOR DIALING TELEPHONE NUMBERS USING ALPHABETIC SELECTIONS

(75) Inventors: Bassam Jarrad, Apex, NC (US); Greg Dunko, Cary, NC (US)

(73) Assignee: Sony Ericsson Mobile Communications AB (SE)

( * ) Notice: Subject to any disclaimer, the term of this patent is extended or adjusted under 35 U.S.C. 154(b) by 242 days.

(21) Appl. No.: 10/241,897

(22) Filed: Sep. 12, 2002

(65) Prior Publication Data

US 2004/0198244 A1 Oct. 7, 2004

(51) Int. Cl.
*H04B 1/38* (2006.01)
*H04M 1/00* (2006.01)

(52) U.S. Cl. .............. 455/564; 455/414.4; 379/355.01; 379/355.02

(58) Field of Classification Search ............. 455/550.1, 455/566, 567, 90.1, 412.1, 414.1, 415, 563–565, 455/414.4; 379/355.01, 355.02, 88.01, 88.03, 379/88.2, 88.07, 88.09, 354, 88.04; 710/58, 710/67, 73; 341/106; 340/202, 200, 73; 178/22.1

See application file for complete search history.

(56) References Cited

U.S. PATENT DOCUMENTS

| 5,809,133 | A | * | 9/1998 | Bartkowiak et al. ......... 379/386 |
| 5,966,652 | A | * | 10/1999 | Coad et al. ............... 455/412.1 |
| 6,160,997 | A | * | 12/2000 | Oberlaender ................ 455/557 |
| 6,256,516 | B1 | * | 7/2001 | Wagner et al. .............. 455/565 |
| 6,950,988 | B1 | * | 9/2005 | Hawkins et al. ............ 715/700 |
| 2002/0115476 | A1 | * | 8/2002 | Padawer et al. ............ 455/564 |

OTHER PUBLICATIONS

Nokia 6160i- Owner's Manual, 2001 Nokia, Inc.*

* cited by examiner

*Primary Examiner*—Edan Orgad
(74) *Attorney, Agent, or Firm*—Myers Bigel Sibley & Sajovec, PA

(57) ABSTRACT

A method is provided for dialing a telephone number from a communication device that includes an alphanumeric input device. The alphanumeric input device allows selection of a plurality of alphabetic characters and selection of a plurality of numeric characters. An alphabetic character that is selected among the plurality of alphabetic characters is sensed. The sensed alphabetic character is translated into a number. A numeric character, that is selected separately from the selection of the alphabetic character, is sensed. A telephone number that includes the translated number and the sensed numeric character is dialed.

16 Claims, 3 Drawing Sheets

APPARATUS, METHODS, AND COMPUTER PROGRAM PRODUCTS FOR DIALING TELEPHONE NUMBERS USING ALPHABETIC SELECTIONS

BACKGROUND OF THE INVENTION

1. Technical Field

The present invention relates to communication devices and more particularly, to apparatus and methods for dialing telephone numbers.

2. Description of the Related Art

Conventional telephones include a numeric keypad for dialing telephone numbers. Individual keys on the keypad are sometimes labeled with both a number and some alphabetic letters. For example, some conventional telephone keypads include the letters "A", "B", and "C" on the same key that is labeled "2", and the letters "D", "E", and "F" on the same key that is labeled "3", and so on in a well-known manner. Such labeling may facilitate the dialing of a telephone number that is known by a sequence of both numeric and alphabetic characters. For example, the telephone number "1 800 FLOWERS" may be dialed by pressing the keys associated with the numbers and letters in the telephone number, which conventionally is associated with the numeric sequence "1 800 356 9377".

The integration of telephone functionality with that of a personal information manager (PIM), personal data assistant (PDA), and/or a messaging device, has led to the need for more advanced user interfaces. Some telephones now include keyboards, such as a conventional QWERTY configured keyboard, that include both alphabetic keys and numeric keys.

SUMMARY OF THE INVENTION

According to embodiments of the present invention, methods, apparatus, and computer program products are provide for dialing telephone numbers using alphabetic selections. In one embodiment, a method is provided for dialing a telephone number from a communication device that includes an alphanumeric input device. The alphanumeric input device allows selection of a plurality of alphabetic characters and a separate selection of a plurality of numeric characters. An alphabetic character that is selected among the plurality of alphabetic characters is sensed. The sensed alphabetic character is translated into a number. A numeric character, that is selected separately from the selection of the alphabetic character, is sensed. A telephone number that includes the translated number and the sensed numeric character is dialed.

In other embodiments of the present invention, a correspondence may be provided between the plurality of alphabetic characters and a plurality of numbers, and the translated number may be identified as the number that corresponds to the sensed alphabetic character. More than one of the plurality of alphabetic characters may correspond to the same one of the plurality of numbers.

DETAILED DESCRIPTION

The present invention will now be described more fully with reference to the accompanying drawings, in which typical embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
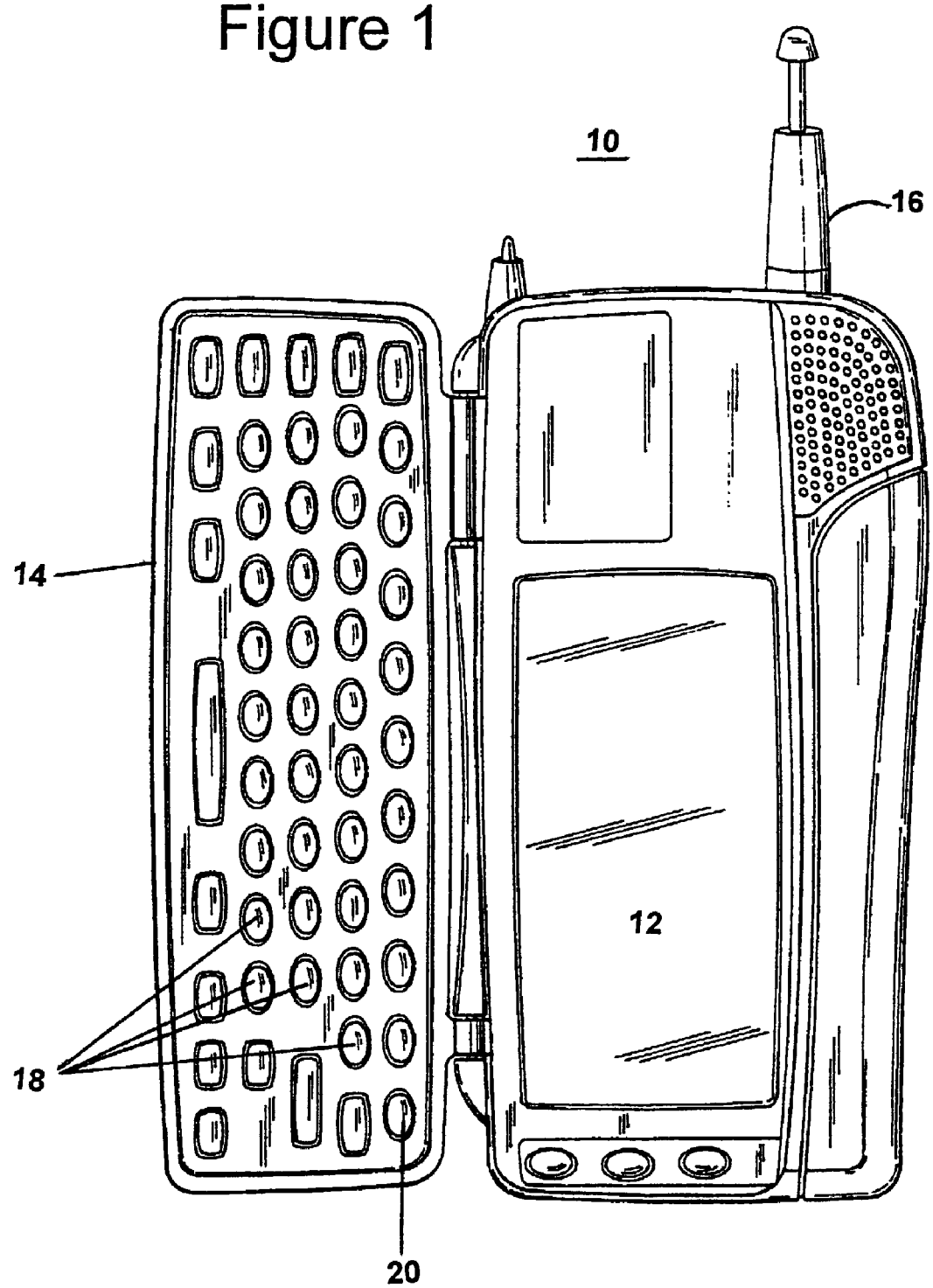
FIG. 1 illustrates a mobile terminal according to some embodiments of the present invention.
Figure 2:
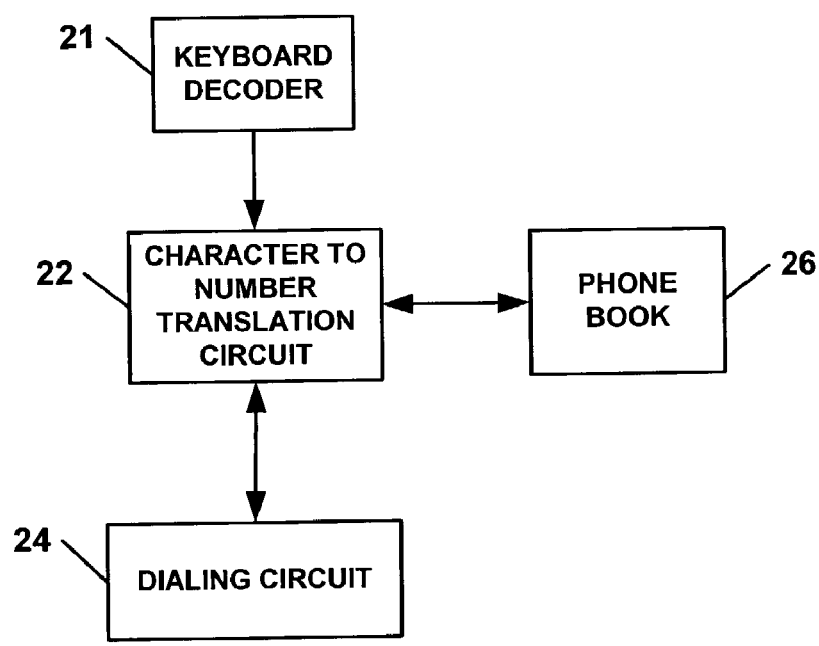
FIG. 2 illustrates a block diagram of an alphabetic character translation and dialing apparatus according to some embodiments of the present invention.
Figure 3:
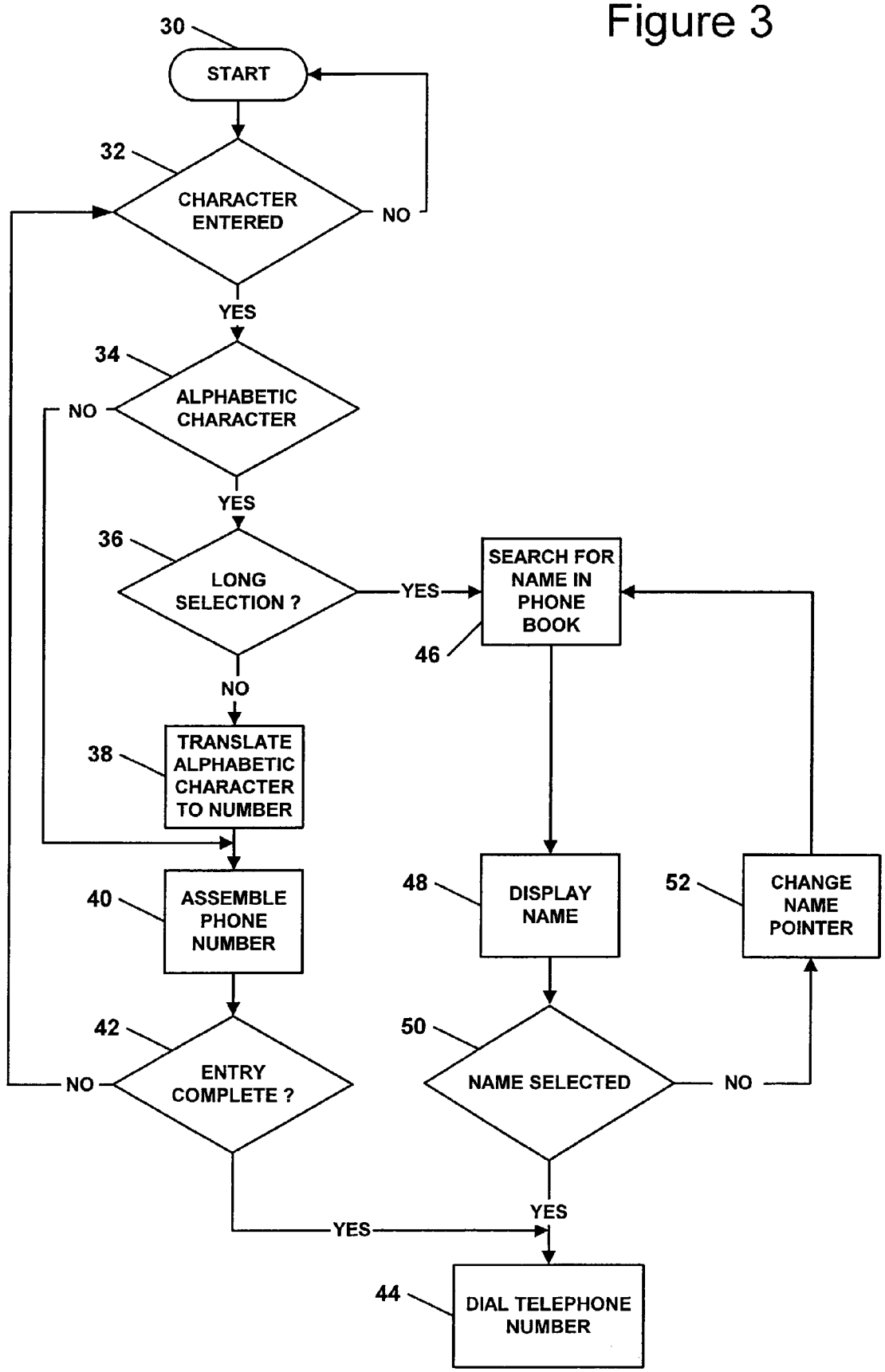
FIG. 3 illustrates operations of the an alphabetic character translation and dialing apparatus according to some embodiments of the present invention.

According to some embodiments of the present invention, communication devices and methods for dialing telephone numbers using alphabetic selections may be provided. FIGS. 1–3 are diagrams illustrating exemplary apparatus and operations according to embodiments of the present invention. It will be understood that operations depicted in the diagrams, and combinations thereof, may be implemented using one or more electronic circuits, such as circuits included in a communication device that dials telephone numbers. It will also be appreciated that, in general, operations depicted in the diagrams, and combinations thereof, may be implemented in one or more electronic circuits, such as in one or more discrete electronic components, one or more integrated circuits (ICs) and/or one or more application specific integrated circuits (ASICs) and/or application specific circuit modules, as well as by computer program instructions which may be executed by a computer or other data processing apparatus, such as a microprocessor or digital signal processor (DSP).

The computer program instructions may also be embodied in the form of a computer program product in a computer-readable storage medium, i.e., as computer-readable program code embodied in the medium for use by or in connection with an instruction execution system. The computer-readable storage medium may include, but is not limited to, electronic, magnetic, optical or other storage media, such as a magnetic or optical disk, an internet server from which a program may be downloaded, or an integrated circuit memory device. Accordingly, FIGS. 1–3 support electronic circuits and other apparatus that perform the specified operations, acts for performing the specified operations, and computer program products configured to perform the specified operations.

Referring to FIG. 1, a mobile terminal 10 is illustrated that includes a display 12, a keyboard 14, and an antenna 16. The keyboard 14 includes a plurality of keys that may be arranged in a conventional QWERTY configuration or another configuration. The keyboard 14 includes a plurality of alphabetic keys 18, configured in three rows, and a separate plurality of numerical keys 20, configured in one row. While one keyboard configuration has been shown for illustration purposes, any alphanumeric input device that enables a user to enter alphanumeric characters is included within embodiments of the present invention. Example alphanumeric input devices according to other embodiments of the present invention include, detachable or wireless keyboards, a touch sensitive display that displays alphanumeric symbols, and voice recognition circuitry that converts voice signals into alphanumeric characters. While separate alphabetic keys and numeric keys have been illustrated for the keyboard 14, some of the keys may be used to enter alphabetic characters in one keyboard entry mode and the same keys may then be used to enter numeric characters in another keyboard entry mode (e.g., making a key selection after, or while, pressing a change mode key).

A user can use the plurality of numerical keys 20 of the keyboard 14 to enter a telephone number for dialing by the mobile terminal 10. According to embodiments of the present invention, a user can also use the alphabetic keys 18 to enter a telephone number, or a portion of a telephone number, to be dialed by the mobile terminal 10. For example, a user can type the sequence "1 800 FLOWERS" using the numerical keys 20 to type the "1 800" portion of the sequence and the alphabetic keys 18 to type the "FLOWERS" portion of the sequence. The mobile terminal 10 translates any alphabetic characters that represent at least a portion of a telephone number (e.g., "FLOWERS") into a numeric string that can be dialed from the mobile terminal 10. For example, the sequence "FLOWERS" can be translated into "3569377" and combined with the sequence "1 800" to provide a complete telephone number "1 800 356 9377". The typed sequence, "1 800 FLOWERS", may be shown to the user on the display 12 as "1 800 FLOWERS", "1 800 356 9377", or both.

In some embodiments of the invention, the mobile terminal 10 may dial the entered telephone number in response to a dialing instruction from the user that indicates that entry of the telephone number has been completed. The dialing instruction may be indicated by a user pressing a key on the keyboard 14 or elsewhere on the mobile terminal 10, or by the passage of a threshold inactivity time, such as after the entry of a dialing sequence and before the pressing of another key. In some embodiments, the mobile terminal 10 may dial the entered telephone number as dual tone multi-frequency (DTMF) signals through a modem connected by wire to a public switched telephone network (PSTN) or may transmit the telephone number through the antenna 16 over a wireless air interface, such over a cellular control channel or traffic channel. In other embodiments, the mobile terminal 10 may communicate a translated telephone number to another device, such as a computer with a wire-line modem, that dials the telephone number.

FIG. 2 illustrates a block diagram of an apparatus, according to some embodiments of the present invention, that may be used to receive, translate, and dial a telephone number that is input with at least some alphabetic characters. A keyboard decoder 21 senses keys that are selected on the keyboard 14 (i.e., typed) and outputs the alphabetic or numerical characters assigned to the selected keys. A translation circuit 22 translates alphabetic characters from the keyboard decoder 21 to pre-defined corresponding numbers and assembles a telephone number that includes the translated numbers and any sensed numeric characters. The assembled telephone number may be passed to a dialing circuit 24 that dials the number in response to a dialing instruction or another indication that entry of the telephone number is complete. In other embodiments, the dialing circuit 24 may dial each translated number, or sensed numeric characters, without waiting for the assembly of a complete telephone number.

In some embodiments, the apparatus may also include a phone book 26. As will be described in more detail below, an entered alphabetic character may represent a portion of a telephone number or it may provide a pointer within a telephone book to a name that may be associated with a telephone number.

FIG. 3 illustrates a flowchart of the operations for sensing the selection of alphabetic characters and numeric characters that represent a telephone number, translating the sensed alphabetic characters into numbers, and dialing a telephone number that includes translated numbers and sensed numeric characters, according to some embodiments of the present invention.

At Block 30, the operations enter a mode in which a user may enter a telephone number by selecting alphabetic characters and/or selecting numeric characters. At Block 32, the operation waits for a character to be entered by a user. The entered character may be checked, at Block 34, as to whether it is a numeric character or an alphabetic character. When the entered character is numeric, it may be assembled, at Block 40, with any other known portions of the telephone number. Until entry of the telephone number is complete, the operation may return to Block 32 to sense the next entered character.

When the entered character is an alphabetic character, a further decision may be made, at Block 36, as to whether the alphabetic character represents a portion of a telephone number, or whether it is a pointer within a telephone book to a name that may be associated with a telephone number. The decision may be responsive to the duration of the user's selection of the alphabetic character (i.e., length of the key press). In some embodiments, the time duration of a user's selection may be compared to a threshold time value, and when the duration is less than the threshold value, the entered alphabetic character may be determined to represent a portion of a telephone number. Otherwise, when the time duration is at least as large as the threshold value, the entered alphabetic character may be determined to represent a pointer within a telephone book.

When the entered alphabetic character represents a portion of a telephone number, the alphabetic character may be translated at Block 38 to a decimal number of other numeric representation of a number that can be dialed. In some embodiments, the translation may be performed by providing a table that maps (provides predefined associations between) each of the plurality of the alphabetic characters and a number. In some other embodiments, the translation may be performed by a mathematical conversion of the alphabetic character to a number. The mathematic conversion may, for example, include performing a mathematic operation on an ASCII number that represents an alphabetic character to form an ASCII number that represents a number.

More than one of the plurality of alphabetic characters may correspond, and be translated, to the same one of the plurality of numbers. Table 1 provides a correspondence between alphabetic characters and numbers according to some embodiments of the present invention.

TABLE 1

| Correspondence Between Alphabetic Characters and Numbers | |
|---|---|
| "A", "B", and "C" | "2" |
| "D", "E", and "F" | "3" |
| "G", "H", and "I" | "4" |
| "J", "K", and "L" | "5" |
| "M", "N", and "O" | "6" |
| "P", "Q", "R", and "S" | "7" |
| "T", "U", and "V" | "8" |
| "W", "X", "Y", and "Z" | "9" |

The translated number may be assembled, at Block 40, with any other known portions of the telephone number. When entry of the telephone number is complete, at Block 42, which may be indicated by a user pressing a button on the mobile terminal 10 or by a threshold amount of inactivity time, the buffered telephone number may dialed at Block 44. The telephone number may include a sequence of translated numbers and entered numeric characters.

In some embodiments, a entered numeric characters and/or a translated number may be dialed without waiting for the entry of a whole telephone number, for example, by skipping the operations of Blocks 40 and/or 42. In other embodiments, entered numeric characters, entered alphabetic characters, and/or translated numbers may be displayed to a user.

In other embodiments, when an entered alphabetic character is determined, at Block 36, to represent a pointer, within a telephone book, to a name that may be associated with a telephone number, the telephone book may be searched, at Block 46, to identify a candidate name. The candidate name may be the first listed name that starts with the entered alphabetic character or, when no name starts with the entered character, the first listed name in alphabetical order after the entered character. For example, entry of the character "J" may cause the first name beginning with the letter "J" to be identified. When no name is found beginning with the letter "J", then names beginning with the letter "K" are searched, and so on, until a name is found or the list is determined to be empty. The identified name and/or telephone number associated with the identified name may be retrieved from the telephone book and displayed to a user at Block 48. When a user indicates, at Block 50, that the retrieved name and/or telephone number is correct, the telephone number may be dialed, at Block 44, from the mobile terminal 10. Otherwise, when a user indicates that the retrieved name and/or telephone number is not correct and/or after a threshold inactivity time, a pointer to another name in the telephone book is formed, at Block 52, and the corresponding name and/or telephone number is retrieved, at Block 46, from the telephone book.

According to other embodiments of the present invention, the apparatus and operations described herein may be embodied in a communication device other than a mobile terminal, such as embodied in a modem, a wire-line telephone, a fixed wireless terminal, a satellite communication terminal, a local area network or wide area network, a computer, personal information managers, or personal data assistants.

In the drawings and specification, there have been disclosed typical embodiments of the invention and, although specific terms are employed, they are used in a generic and descriptive sense only and not for purposes of limitation, the scope of the invention being set forth in the following claims.

That which is claimed:

1. A method of dialing a telephone number from a communication device that includes an alphabetic input device that allows selection of a plurality of alphabetic characters, the method comprising:
   sensing a duration of a user's selection of an alphabetic character that is selected among the plurality of alphabetic characters of the alphabetic input device;
   selectively translating the sensed alphabetic character into a number based on the duration of selection of the alphabetic character; and
   dialing a telephone number that includes the translated number, wherein:
   the sensing a duration of a user's selection of an alphabetic character senses a sequence of a plurality of selected alphabetic characters;
   the translating translates the sequence of the plurality of selected alphabetic characters to a sequence of numbers; and
   the dialing dials a telephone number that includes the translated sequence of numbers and the sensed numeric character.

2. A method according to claim 1, wherein the translating comprises:
   providing a correspondence between the plurality of alphabetic characters and a plurality of numbers; and
   identifying as the translated number, one of the plurality of numbers that corresponds to the sensed alphabetic character.

3. A method according to claim 2, wherein more than one of the plurality of alphabetic characters corresponds to the same one of the plurality of numbers.

4. A method according to claim 3, wherein:
   alphabetic characters "A", "B", and "C" each correspond to the number "2".

5. A method according to claim 3, wherein:
   alphabetic characters "A", "B", and "C" each correspond to the number "2";
   alphabetic characters "D", "E", and "F" each correspond to the number "3";
   alphabetic characters "G", "H", and "I" each correspond to the number "4";
   alphabetic characters "J", "K", and "L" each correspond to the number "5";
   alphabetic characters "M", "N", and "O" each correspond to the number "6";
   alphabetic characters "P", "Q", "R", and "S" each correspond to the number "7";
   alphabetic characters "T", "U", and "V" each correspond to the number "8"; and
   alphabetic characters "W", "X", "Y", and "Z" each correspond to the number "9".

6. A method according to claim 1, wherein the dialing occurs after sensing an indication from a user that entry of the phone number is complete.

7. A method according to claim 1, further comprising:
   selectively searching a phone book in the communication device to identify a name that corresponds to a selected alphabetic character based on the duration of selection of the alphabetic character;
   displaying the identified name from the phone book for viewing by a user;
   retrieving a telephone number from the phone book that corresponds to the identified name; and
   dialing the retrieved telephone number in response to a name selection signal that is received from a user.

8. A method of dialing a telephone number from a communication device that includes an alphanumeric input device that allows selection of a plurality of alphabetic characters and separate selection of a plurality of numeric characters, the method comprising:
   sensing a duration of a user's selection of an alphabetic character that is selected among the plurality of alphabetic characters of the alphanumeric input device;
   selectively translating the sensed alphabetic character into a number based on the duration of selection of the alphabetic character;
   sensing a numeric character that is selected among the plurality of numeric characters separately from the selection of the plurality of alphabetic characters; and
   dialing a telephone number that includes the translated number and the sensed numeric character, wherein the communication device includes a keyboard with a plurality of alphabetic keys and a separate plurality of numeric keys, and the sensing a duration of a user's selection of an alphabetic character is in response to a user selecting one of the plurality of alphabetic keys, and the sensing a numeric character is in response to a user separately selecting one of the separate plurality of numeric keys.

9. A communication device, comprising:
an alphabetic input device that provides a plurality of alphabetic characters for selection, and that is configured to sense a selection of an alphabetic character;
a translation circuit that is operative to selectively translate a selected alphabetic character into a number based on a duration of a user's selection of the alphabetic character; and
a dialing circuit that is operative to dial a telephone number that includes the translated number, wherein:
the alphabetic input device is operative to sense a sequence of a plurality of selected alphabetic characters;
the translation circuit is operative to translate the sequence of the plurality of selected alphabetic characters into a sequence of numbers; and
the dialing circuit is operative to dial a number that includes the translated sequence of numbers and the selected numeric character.

10. A communication device according to claim 9, wherein the translation circuit is operative to provide a correspondence between the plurality of alphabetic characters and a plurality of numbers, and is operative to identify as the translated number, one of the plurality of numbers that corresponds to the selected alphabetic character.

11. A communication device according to claim 10, wherein more than one of the plurality of alphabetic characters correspond to the same one of the plurality of number.

12. A communication device according to claim 11, wherein:
alphabetic characters "A", "B", and "C" each correspond to the number "2".

13. A communication device according to claim 11, wherein:
alphabetic characters "A", "B", and "C" each correspond to the number "2";
alphabetic characters "D", "E", and "F" each correspond to the number "3";
alphabetic characters "G", "H", and "I" each correspond to the number "4";
alphabetic characters "J", "K", and "L" each correspond to the number "5";
alphabetic characters "M", "N", and "O" each correspond to the number "6";
alphabetic characters "P", "Q", "R", and "S" each correspond to the number "7";
alphabetic characters "T", "U", and "V" each correspond to the number "8"; and
alphabetic characters "W", "X", "Y", and "Z" each correspond to the number "9".

14. A communication device according to claim 9, wherein:
the dialing circuit is operative to dial the telephone number is response to receiving an indication signal from a user that entry of the phone number is complete.

15. A computer program product for dialing a telephone number from a communication device that includes an alphabetic input device that allows selection of a plurality of alphabetic characters, the computer program product comprising program code embodied in a computer-readable storage medium, the computer program code comprising:
program code for sensing an alphabetic character that is selected among the plurality of alphabetic characters of the alphabetic input device;
program code for selectively translating the sensed alphabetic character into a number based on a duration of a user's selection of the alphabetic character; and
program code for dialing a telephone number that includes the translated number, wherein the program code for translating the sensed alphabetic character comprises:
program code for providing a correspondence between the plurality of alphabetic characters and a plurality of numbers; and
program code for identifying as the translated number, one of the plurality of numbers that corresponds to the sensed alphabetic character.

16. A computer program product according to claim 15, wherein more than one of the plurality of alphabetic characters corresponds to the same one of the plurality of numbers.

* * * * *